(No Model.)

W. R. EVANS.
ARTIFICIAL TOOTH.

No. 323,306. Patented July 28, 1885.

Attest:
Wallern Donaldson
F. L. Middleton

Inventor
Warren R. Evans.
by Joyce & Speer
Attys

UNITED STATES PATENT OFFICE.

WARREN R. EVANS, OF PORTLAND, MAINE

ARTIFICIAL TEETH.

SPECIFICATION forming part of Letters Patent No. 323,306, dated July 28, 1885.

Application filed April 28, 1885. (No model.)

*To all whom it may concern:*

Be it known that I, WARREN R. EVANS, of Portland, in the county of Cumberland and State of Maine, have invented a new and useful Improvement in Teeth; and I do hereby declare that the following is a full, clear, and exact description of the same.

My invention relates to dentures. The object of the invention is to provide a thin plate and a metallic surface for the tongue, combined with the perfect fit of a plastic material.

It is well known that metal plates for dentures afford a better surface for the tongue, and are also superior by reason of their thinness, as compared with the ordinary rubber or celluloid plate; but they are more difficult to fit to the palatine surface, and cannot be made to give the same amount of "suction" in the mouth. On the other hand, the unavoidable thickness of the hard rubber and celluloid plates is a serious defect. By the combination of a metallic perforated plate with a molded or cast backing for contact with the surface of the mouth, and to fit its inequalities as formed by the impression-cup, I have avoided the defect of each, and combined the advantages of both, of the old forms of dental-plate.

Figure 1:
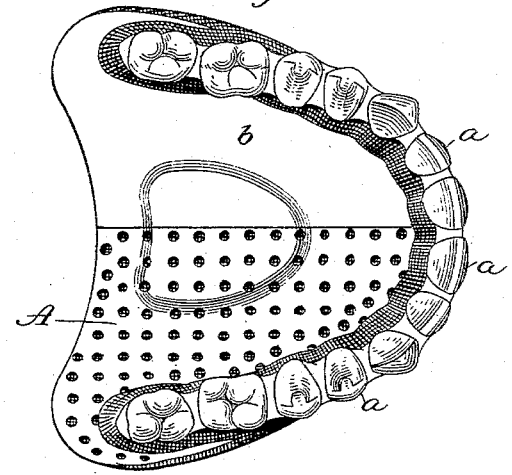
Figure 2:
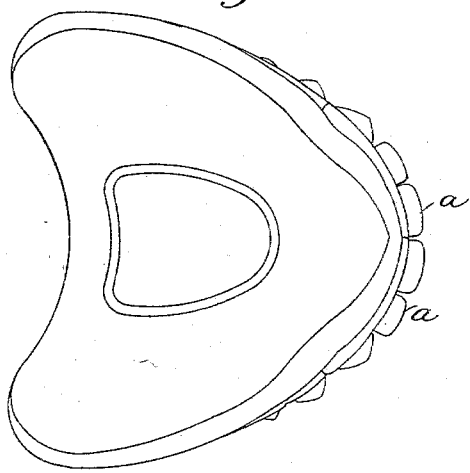
Figure 3:
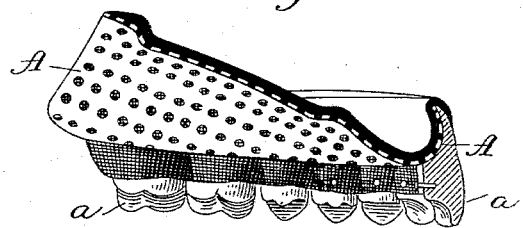

In the accompanying drawings, Figure 1 shows the under surface of the plate; Fig. 2, the upper surface, and Fig. 3, a section on line $x$ $x$ of Fig. 1.

In these drawings, A represents the plate, of any suitable metal known for the purpose—such as gold, silver, platinum, &c.—to which the teeth $a$ are fixed, as hereinafter described. On this plate I place a backing of hard rubber, celluloid, or other suitable substance, which is adapted to be molded or cast into proper shape, and, when hardened, to retain its shape under the conditions of use in this place. The metal constitutes the main body of the plate, and the hard rubber, celluloid, or other packing is formed upon the metal plate and caused to adhere thereto. I effect the union of the rubber and metal, simply to give a better palatine surface, and, incidentally, to hold the teeth, by perforating the metallic plate, and causing the rubber or other material to pass into the perforations while in a plastic or soft condition, so that the rubber or other material entering the holes forms a bond or union when it hardens. The hard rubber or celluloid flows through the perforations and forms about the teeth and holds them in place. If desired, the perforated plate may be covered by a perfectly smooth imperforate plate, as shown in Fig. 1 at $b$.

In order that those skilled in the art may be able more effectually to carry out my invention, I will describe the mode of operation by which I make the above-described plate.

I first take an impression of the mouth in the ordinary manner with wax or other suitable material. From this I form a cast of plaster, and on this plaster-cast I place a sheet of wax about one-sixteenth of an inch in thickness, or approximately equal to the thickness of the backing which is to be applied to the dental plate. This wax raises or increases the cast, and upon this the die is made for forming the metallic plate. This plate is preferably thinner than ordinary dental-plates, and is perforated throughout with small holes adapted to receive the rubber or other backing. This plate is formed on the die, and is fitted in shape to the mouth, but in size is too large by the thickness of the wax plate placed over the cast, as before explained. This plate, when formed on the die, is laid on the wax-covered cast, which it fits exactly, and then the teeth are ground in place and properly waxed. This cast, with the teeth, is then placed in the drag of a flask of proper size, with the plate and teeth uppermost, and the spaces in the drag and around the cast are filled with liquid plaster. The cope of the flask is then set on, and the space within it is filled with plaster, in the ordinary manner of molding. When the plaster is set I separate the cope from the drag and remove the plate from its bed in the cast contained in the drag. I then remove all the wax, both from the cast in the drag and from the teeth remaining imbedded in the plaster in the cope. I then lay upon the cast which is in the drag a properly-shaped thin sheet of rubber, celluloid, or equivalent material, in soft condition, and press it to fit closely. I also add to the teeth in the cope, along the insides near the pins from which the wax was removed, a small portion of rubber, celluloid, or equivalent material, and then replace the cope upon the drag. The parts are then screwed together, pressing the teeth, plate, and rubber closely to each other.

This causes the rubber or other material to enter the perforations in the plate, and to unite with the rubber about the base of the teeth. On the edges of the plate it overlaps and joins the outsides of the teeth at the base, and when vulcanized forms a firm union. In finishing the plate all the rubber is removed from the lingual surface, excepting that at the base of the teeth. This leaves a metal surface for the tongue, with a hard rubber, celluloid, or like surface for the mouth, and the whole is much thinner and stronger than a plate of rubber or celluloid can be practically made.

Instead of the plastic material above described, I may use an easily-melted metal known or fit for dental purposes, without material change. In this case I place the plate and teeth, as above described, in the flask, but instead of using any rubber or celluloid, I leave the space of such plastic material vacant, and run in the metal in a liquid condition. This takes the form of the cast, and flows around and through the plate and about the base of the teeth with substantially the same effect.

I am aware that compound dental-plates are not new, having been before devised, with metal lingual surface only added to a soft-rubber plate; also, that a compound plate has been devised with inner perforated plate, and rubber on both sides, and I do not, broadly, claim a compound plate. In my plate the metal forms the main body of the whole plate, and the lingual surface also, while the rubber or equivalent material forms the binding material for the teeth and the accurate fitting to the mouth.

I claim—

A denture composed of a perforated metal plate having a molded or cast interior surface to fit the palatine surface, combined with teeth set on the perforated plate and held in place by the molded or cast material, the metal plate forming the lingual surface, and forming also the basis of the whole plate, all substantially as described.

In testimony whereof I have signed my name to this specification in the presence of two subscribing witnesses.

WARREN R. EVANS.

Witnesses:
F. L. MIDDLETON,
I. E. MIDDLETON.